United States Patent
Tsai et al.

(10) Patent No.: US 9,127,915 B1
(45) Date of Patent: Sep. 8, 2015

(54) SELF-HEALING COMPOSITES

(71) Applicant: Novana, Inc., Alpharetta, GA (US)

(72) Inventors: Fu-Jya Daniel Tsai, Alpharetta, GA (US); John Bicknell Luscombe, III, Alpharetta, GA (US)

( * ) Notice: Subject to any disclaimer, the term of this patent is extended or adjusted under 35 U.S.C. 154(b) by 109 days.

(21) Appl. No.: 13/668,617

(22) Filed: Nov. 5, 2012

(51) Int. Cl.
| | |
|---|---|
| *F41H 1/02* | (2006.01) |
| *F41H 5/04* | (2006.01) |
| *C08J 5/18* | (2006.01) |
| *B32B 3/12* | (2006.01) |
| *B32B 27/08* | (2006.01) |
| *B32B 27/12* | (2006.01) |

(52) U.S. Cl.
CPC .. *F41H 1/02* (2013.01); *B32B 3/12* (2013.01); *B32B 27/08* (2013.01); *B32B 27/12* (2013.01); *C08J 5/18* (2013.01); *F41H 5/04* (2013.01); *B32B 2307/56* (2013.01); *B32B 2571/02* (2013.01); *Y10T 428/24149* (2015.01); *Y10T 428/24999* (2015.04); *Y10T 428/249986* (2015.04)

(58) Field of Classification Search
USPC ................. 428/317.9, 315.5, 315.7
See application file for complete search history.

(56) References Cited

U.S. PATENT DOCUMENTS

| | | | |
|---|---|---|---|
| 4,282,277 A * | 8/1981 | Austen et al. ................. 428/36.4 |
| 4,778,633 A | 10/1988 | Kiang et al. | |
| 4,876,941 A | 10/1989 | Barnes et al. | |
| 6,216,579 B1 | 4/2001 | Boos et al. | |
| 6,261,677 B1 | 7/2001 | Tsai et al. | |
| 6,389,594 B1 | 5/2002 | Yavin | |
| 7,041,372 B2 | 5/2006 | Rhoads et al. | |
| 7,520,205 B1 | 4/2009 | Colliflower et al. | |
| 7,543,523 B2 | 6/2009 | Hunn | |
| 7,603,939 B2 | 10/2009 | Cohen | |
| 2006/0187430 A1 * | 8/2006 | Dodoc et al. .................... 355/53 |
| 2011/0200772 A1 * | 8/2011 | Niewold et al. .............. 428/35.7 |

FOREIGN PATENT DOCUMENTS

WO    WO 2010017406 A1 *    2/2010

* cited by examiner

*Primary Examiner* — Hai Vo (57) ABSTRACT

Lightweight self-healing composites comprise region-specific microstructures that dampen ballistic energy wherein the region-specific microstructures include at least one semi-crystalline thermoplastic and at least one nanoparticle nucleating agent. The distinctive region-specific microstructures allow the composites to dissipate high frequency and high amplitude shock wave into heat and reassemble itself into its original microstructure through reversible compression and decompression cycles. The region-specific microstructures comprise soft regions, comprised of highly polymeric entangled chains and hard regions, comprised of lamellae or spherullites anchored onto nanoparticle nucleating agents. The soft regions can trap the incoming energy shock wave while the hard regions provide the anchor sites, to allow the entangled chains to remain in place upon encountering ballistic impact. The anti-ballistic composites can be made in a monolithic form and do not significantly degrade under repeated fire.

10 Claims, 6 Drawing Sheets

SELF-HEALING COMPOSITES

CROSS-REFERENCE TO RELATED APPLICATIONS

This application is based on and claims the benefits of U.S. Provisional Application Ser. No. 61/557,407, filed Nov. 8, 2011.

BACKGROUND OF THE INVENTION

1. Field of Invention

The present invention generally relates to lightweight self-healing composites comprised of region-specific microstructures and methods for their manufacture and, in particular, to lightweight self-healing composites which used in anti-ballistic applications.

2. Background of the Invention

The drive towards designing the "high-tech" solider and combat vehicle is fueling development of new material technologies that rival the revolution in materials seen during World War II, when the modern plastics industry was created. The primary function of anti-ballistic armor is to impede projectile penetration and to quickly diffuse the impact energy. To date anti-ballistic materials are primarily made from steel, high strength woven fibers including Spectra®, Kevlar®, Innegra-S® and Dyneema®, and ceramics of differing compositions.

In most cases, except for anti-ballistic steel, these commercially available products are woven, or in the case of Dyneema®, non-woven, in various configurations. Fibers are usually combined with other substrates, different in composition, to produce the final anti-ballistic material. The final products produced are composites of layers of anti-ballistic fabrics and substrates. These substrates include ceramic, steel, fiberglass, and in some cases thermoplastic materials as well as fiber cement board. Fabrics alone are not used as armor in high impact ballistic scenarios. Anti-ballistic steel is heavy and difficult to form, although it can be monolithic in form, not requiring secondary substrate layers. Some forms fuse two different types of steel of differing hardness as taught in U.S. Pat. No. 7,520,205, in any case they add to the armor's weight.

Ceramics are brittle in general and tend to degrade with multiple ballistic impacts requiring substrates to add to their integrity. Some are incased in thermoplastics or thermoset polymers to keep fragments of ceramic materials contained. Typical examples are described in U.S. Pat. No. 6,216,579, U.S. Pat. No. 6,389,594, and U.S. Pat. No. 7,603,939.

All current anti-ballistic materials are expensive and in most cases heavy. It is believed what is needed is a monolithic composite material that is easily formed, does not degrade under repeated fire, and is inexpensive to produce.

DETAILED DESCRIPTION OF THE PREFERRED EMBODIMENT

In one embodiment of this present invention, lightweight self-healing composites comprising region-specific microstructures that can dampen significant ballistic energy are described. This material not only can absorb high impact projectile piercing energy but it can also be lighter than traditional anti-ballistic materials such as steel and ceramic and can be made less expensive than Kevlar®.

Contrary to the current practice of using expensive fabrics made of high strength fibers, such as Kevlar®, Dyneema®, or Spectra Shield®, or ceramics, which can be brittle and difficult to mold; the present invention can create a thermoplastic nanocomposite material comprising region-specific microstructures in a monolithic form. The thermoplastic nanocomposite based material can be flexible enough to be molded into various three dimensional shapes and less expensive because components of the material can be possibly sourced from the waste stream. Furthermore, this material can be flame retardant and is not affected by oil, acidic, or basic solutions, and is not affected by blowing sand, dust or saltwater. At high temperatures, the material can form localized ceramic-like structures, insulating surrounding material and adding to the polymeric strength through crystallization. At certain material thickness, the material can absorb multiple ballistic impacts, having the capability to trap bullets within the material matrix. Ballistic testing shows the material can take multiple hits, in excess of 2,500 rounds of AK-47, M-16AP, and M-240 MG fire without target degradation but maintaining integrity and exhibiting self-healing behavior. No spall was observed during testing.

The present invention describes a lightweight thermoplastic nanocomposite material comprising region-specific microstructure that dampens high impact, ballistic energy. It is believed that the region-specific microstructure can be best illustrated with a spring-ball system as explained below. The spring-ball system comprises both soft regions and hard regions being arranged in such a way that it can dampen incoming ballistic energy while still capable of returning to its original microstructure after the impact. By definition, the soft regions are the microstructure domains comprising highly entangled polymeric chains, primarily in the amorphous phase; the hard regions are the microstructure domains comprising the polymeric crystalline spherullites or lamellae anchored onto nanoparticles. The hard regions comprising the thermoplastic microcrystallines anchored on nanoparticles are substantially surrounded by the soft regions comprising thermoplastic amorphous chains. The hard regions and the soft regions are also connected each other by at least one semi-crystalline thermoplastic coexisting with one end in the soft regions and with the other end in the hard regions. Preferably, the microcrystalline domains in the hard regions can further form a honeycomb-like network structure with their surrounding microcrystalline domains to reinforce the structure stability. The soft regions can trap the incoming energy shock wave while the hard regions provide the anchor sites, to allow the entangled chains to remain in place upon encountering ballistic impact.

In one embodiment of this present invention, the system can function as a matrix network of many interconnected spring-balls. Microscopically, the spring-ball structure undergoes reversible compression and decompression cycles upon encountering ballistic impacts, like a spring, through which the shock energy is dissipated. The progression of shock waves may cause two types of deformation to the materials, i.e. elastic deformation in the spring-like reaction of the material, and heat loss as a form of thermal energy consumed by melting the polymer and morphological conversion of the nanoparticles.

In another embodiment of this present invention, this composite material with region-specific microstructure exhibits self-healing mechanism to allow the system to take multiple hits without significant material degradation like other traditional non-thermoplastic based anti-ballistic materials. As the projectile impacts the composite material, some kinetic energy is converted to heat. On a macro scale the polymer begins to melt, and the projectile gives up energy. When the composite with region-specific microstructure, encounter the incoming projectile, heat and pressure build at the tip of the bullet, melting the material which then flows around the bullet and cools as it fills the space created by the bullet's path. As heat and energy are given up, as drag increases, the flight path of the projectile becomes unstable. As the bullet tumbles, drag increases to the point the projectile is captured within the polymeric matrix and the bullet path is healed or re-sealed. If another bullet passes down the exact path or crosses the path, i.e. bullet on bullet, the second projectile will not only encounter the polymer matrix, but also collide with fragments of the previous projectile. As a result, the second bullet stops faster as the process repeats. This mechanism not only prevents the material from significant degradation but also makes it stronger due to the added dense materials. However, if only rely on the above mentioned mechanism, the thermoplastic based material may require a significantly large thickness so as to stop a high impact ballistic projectile.

As contrasted to some anti-ballistic thermoplastic based materials in which the impact energy absorption is due mainly to chain entanglement of the polymeric matrix or by density differences within the matrix to slow down the bullet, this invention uses a totally distinctive approach. The ability of absorbing energy and self-healing upon ballistic impact for the lightweight thermoplastic based material in this invention can be best illustrated on a micro scale level as explained in the following paragraphs.

Figure 1:
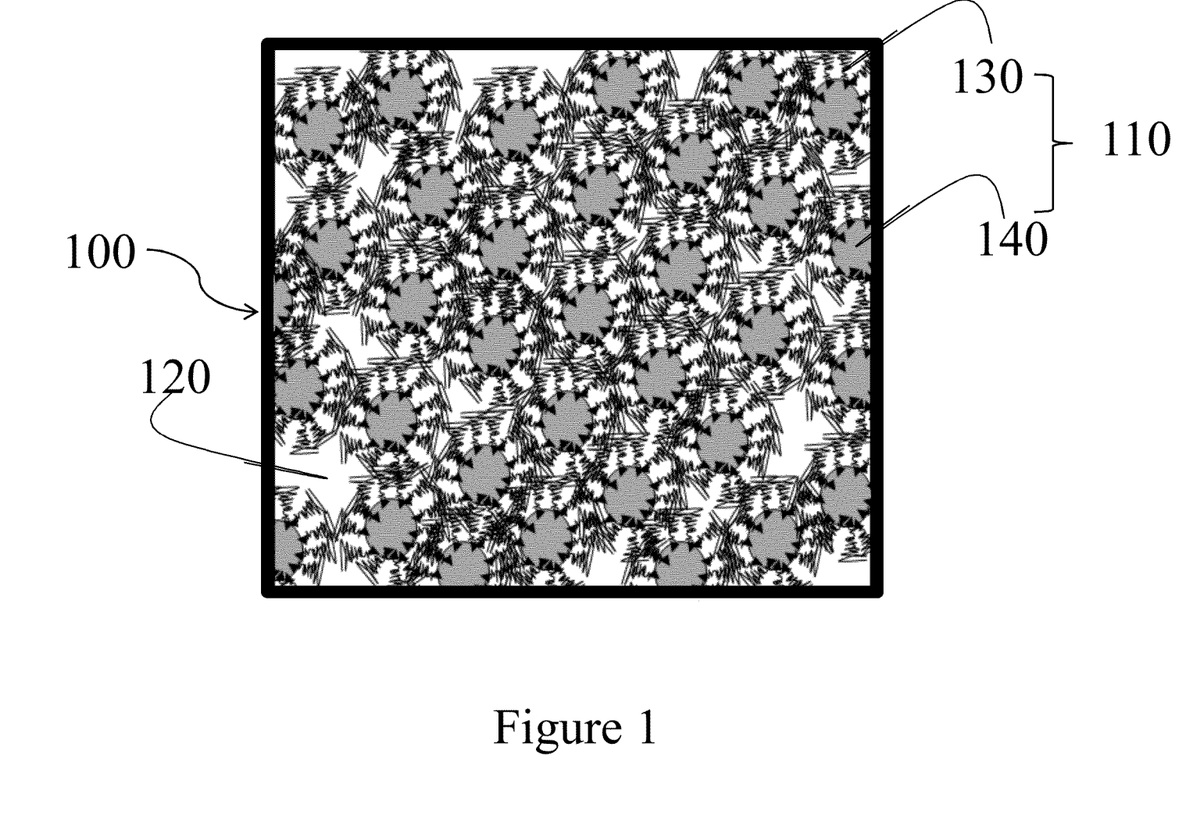
FIG. 1: A schematic illustration of the microscopic structure of the lightweight self-healing composites comprising region-specific microstructures of the present invention

As shown in FIG. 1, these unique region-specific microstructures 100 can be described as microscopic networks of spring balls, comprised of hard microcrystalline regions 110 and soft amorphous regions 120. The soft regions 120, (white background), are formed by highly entangled polymeric chains that can diminish the ballistic energy wave, while the hard regions 110 are formed by the aggregates of lamellae (or spherullites) 130, (black concentrated lines), on a nanoparticle 140, (shown in grey circles), provide the anchor sites holding against the loose chains 120. The hard regions 110 are substantially surrounded by the soft regions 120. The soft regions 120 are more or less connected each other by the semi-crystalline polymer with one end in the soft regions 120 and with the other end anchored in the hard regions 110. In one preferred aspect of this present invention, the aggregates of lamellae (or spherullites) domain 130 can further connect with its surrounding aggregates of lamellae (or spherullites) domains to form a honeycomb-like porous network structure. This honeycomb-like structure where each individual honeycomb (or pore) may further somehow enclose a nanoparticle provides additional structural reinforcement for the composites upon ballistic impact. These region-specific microstructures 100 function as a spring-ball network capable of dampening and dissipating incoming ballistic energy through reversible compression and decompression cycles and have the self-healing ability through re-crystallization of the melting chains onto the nanoparticle nucleating agents.

In one embodiment of this invention, as ballistic energy impacts the material of this invention, the incoming kinetic energy of the bullet is partially converted to heat while retaining a fraction of its original kinetic energy. The heat combining with the shock wave as a result of the kinetic energy immediately expand the packing structure of the impact zone as shown in FIG. 1, where the hard regions 110 are packed rather densely prior to the impact.

Figure 2:
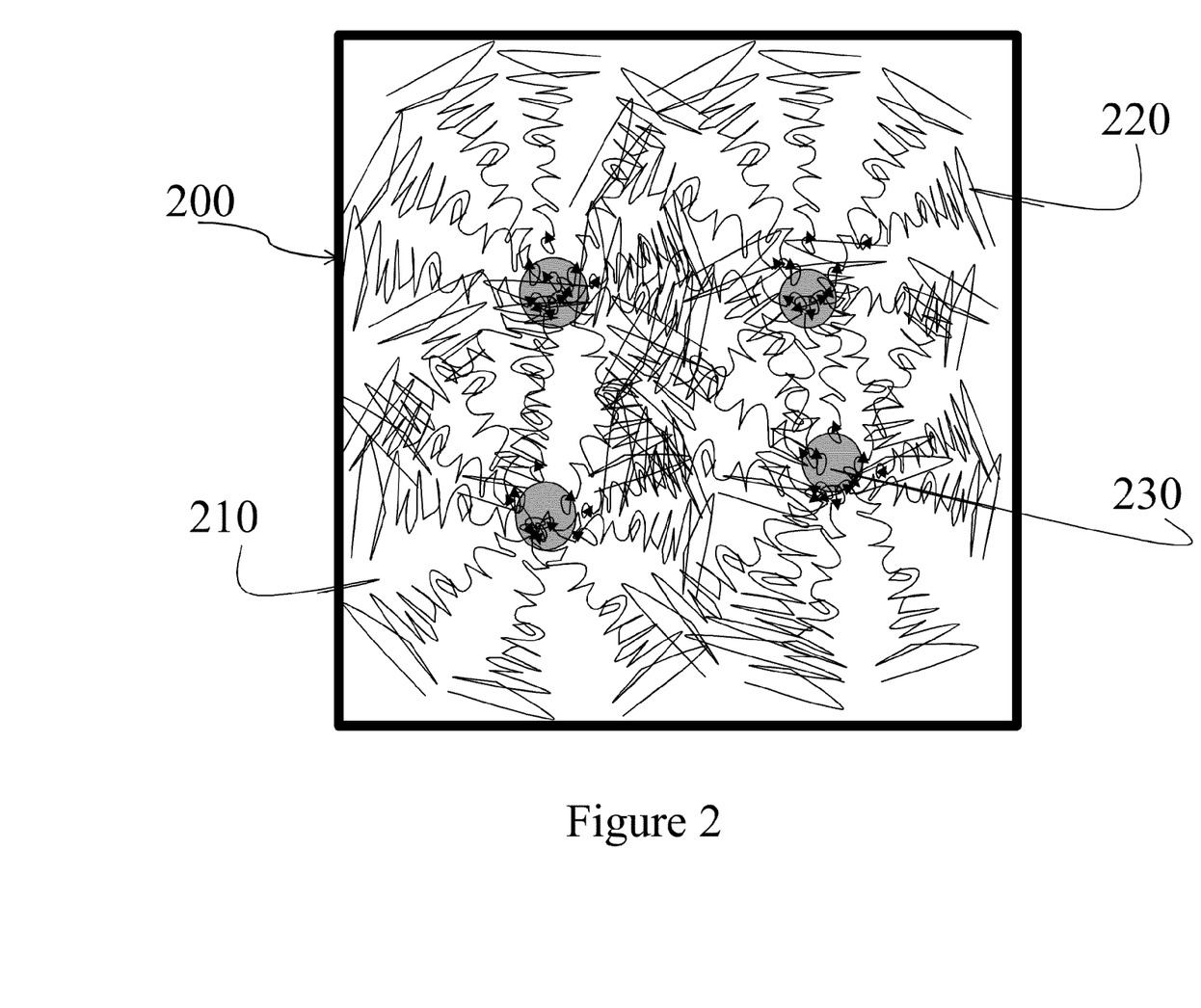
FIG. 2: A schematic illustration of the microscopic structures of an expanded impact zone of the lightweight self-healing composites comprising region-specific microstructures of the present invention

During a ballistic impact, the microstructure of the impact zone can be best illustrated as the expanded impact zone microstructure 200 in FIG. 2. When piercing impact energy enters the impact zone with a microstructure as shown in FIG. 1, the converted heat facilitates the melting of the amorphous domains in soft regions 120 and the microcrystalline domains 130 of the hard regions 110 in the impact zone. As a result, the microcrystalline domains 130 in the impact zone loosen up into expanded chains 220 with one end still anchored to the nanoparticles 230 as described in the expanded impact zone 200 in FIG. 2.

After the ballistic impact, the expanded impact zone microstructure 200 as shown in FIG. 2 can return to its original state similar to the state as shown in FIG. 1. This expansion and depression mechanism functioning as a spring-ball network can allow the system to repeatedly undergo self-healing and ready to take multiple hits. These expanded chains 220 with one ends still anchor on the nanoparticles 230 intertwine with the soft amorphous chains 210 to absorb and dissipate the incoming energy wave. In addition, the nanoparticles 230 not only function as anchor point to stabilize the spring-ball structure but also act as in situ nucleating agents facilitating the molten polymer chains to re-crystallize around the projectile's path when the temperature cools down.

The re-crystallization on the nanoparticles 230 along the projectile's path that is then compressed again and return back to the microstructure layout as shown in FIG. 1. If the material is hit again, it has been strengthened by holding against the entangled chains 120 with the microcrystalline region anchor points 110 and is less vulnerable to further attacks. This process allows the composites to efficiently dissipate incoming ballistic energy through reversible compression and decompression cycles and have the self-healing ability through re-crystallization of the melting chains onto the nanoparticle nucleating agents.

In another embodiment of this invention, the microstructure of the lightweight composites can have an additional built-in mechanism to dissipate and absorb the extremely high intensity of heat generated at impact by converting the morphology of the nanoparticles 140 themselves from their original amorphous phase into crystalline phase.

Process for Making the Region-Specific Microstructure

Figure 3:
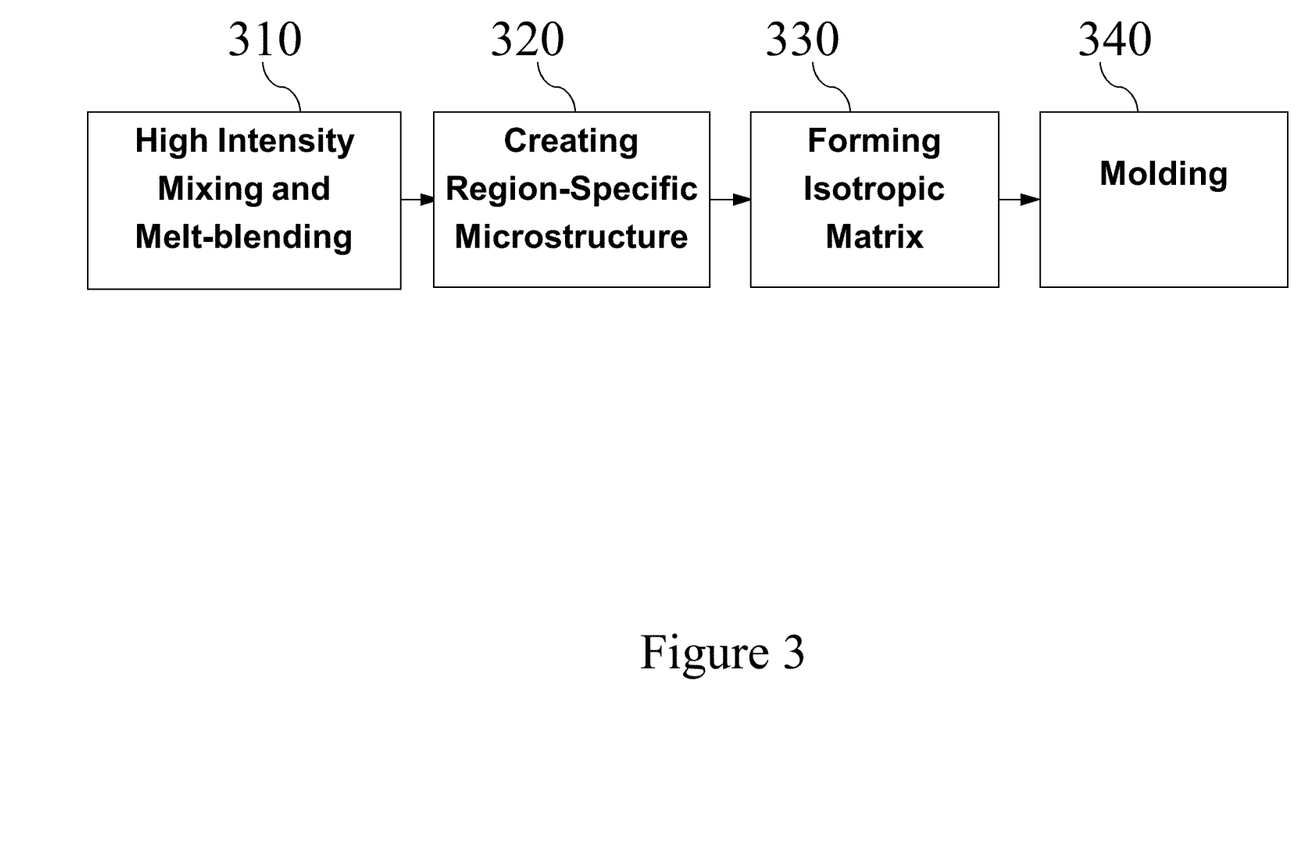
FIG. 3: A high level block diagram illustrating an exemplary method of manufacturing lightweight self-healing composites comprising region-specific microstructures that dampen ballistic energy

In another embodiment of this present invention, a method of making the lightweight self-healing composites comprising region-specific microstructures that dampen significant ballistic energy is described. In one general arrangement of this invention, the self-healing composites with region-specific microstructures can be made, comprising the following processing steps as shown in FIG. 3:

1. The high intensity shear-induced mixing and melt-blending step 310 in FIG. 3 is to enable a well-dispersed nanoparticle-matrix system. This step can be carried out using a high intensity mixing apparatus such as a Henshel mixer to ensure the well dispersion of the nanoparticle nucleating agent, compatiblizer, and other possible ingredients in the resin matrix. The mixing can also be carried out by using conventional extruders including but not limited to single screw, and twin screw extruders. The mixing step can be conducted in a batch process or in a continuous process as long as the desired homogeneity of the mixture is achieved.
2. The region-specific microstructure forming step 320 in FIG. 3 is a step that generates the preferred microstructures including the soft regions (amorphous domains) and the hard regions (microcrystalline domains anchoring on the nanoparticles) as described in FIG. 1 of the present invention. This step can be accomplished using an extruder under a preferable temperature and processing conditions, to maximize the formation of the region-specific microstructure. The step 1 and 2 can be combined as long as the in-situ mixing can be ensured.
3. The isotropic matrix forming step 330 in FIG. 3 is to generate uniform physical properties in all directions and thus the multi-dimensional anti-ballistic performance. In this process, the resulting nascent extrudate from the step 320 was aligned in an alternating crisscross or spiral pattern in multiple planes, in a mold to create an isotropic matrix.
4. The molding step 340 in FIG. 3 is to apply high compression pressure to the nascent extrudate in the mold at an elevated temperature, utilizing a hot press with controllable temperature profiles. In one embodiment of this present invention, the molding pressure and temperature are important in determining the region-specific microstructure and thus the final properties of the anti-ballistic performance. It is preferred to have more uniform and compact structure for acquiring better anti-ballistic performance especially for higher speed projectile. The higher molding pressure will result in more compact arrangement of the region-specific microstructure. The higher the mold temperature below the melting temperature of the polymer matrix will also facilitate the compacting process and induce more micro-crystallinity. The molding process can also be carried out by injection molding process where the temperature and the pressure (including both the injection pressure and the mold clamping pressure) can be optimized to induce the formation of microcrystalline and facilitate the compaction of region-specific microstructure. The other molding process including but not limited to injection molding, rotational-molding, extrusion molding can also be employed, as long as the proper temperature and pressure can be applied to the extrudate.
5. Lamination with other materials Optionally, the resulting material produced form step 340 can be further laminated with other materials including the material of this invention with lower concentrations of nanoparticles and other materials such as anti-ballistic fabrics, reinforced composites, and metal sheets.

Figure 4:
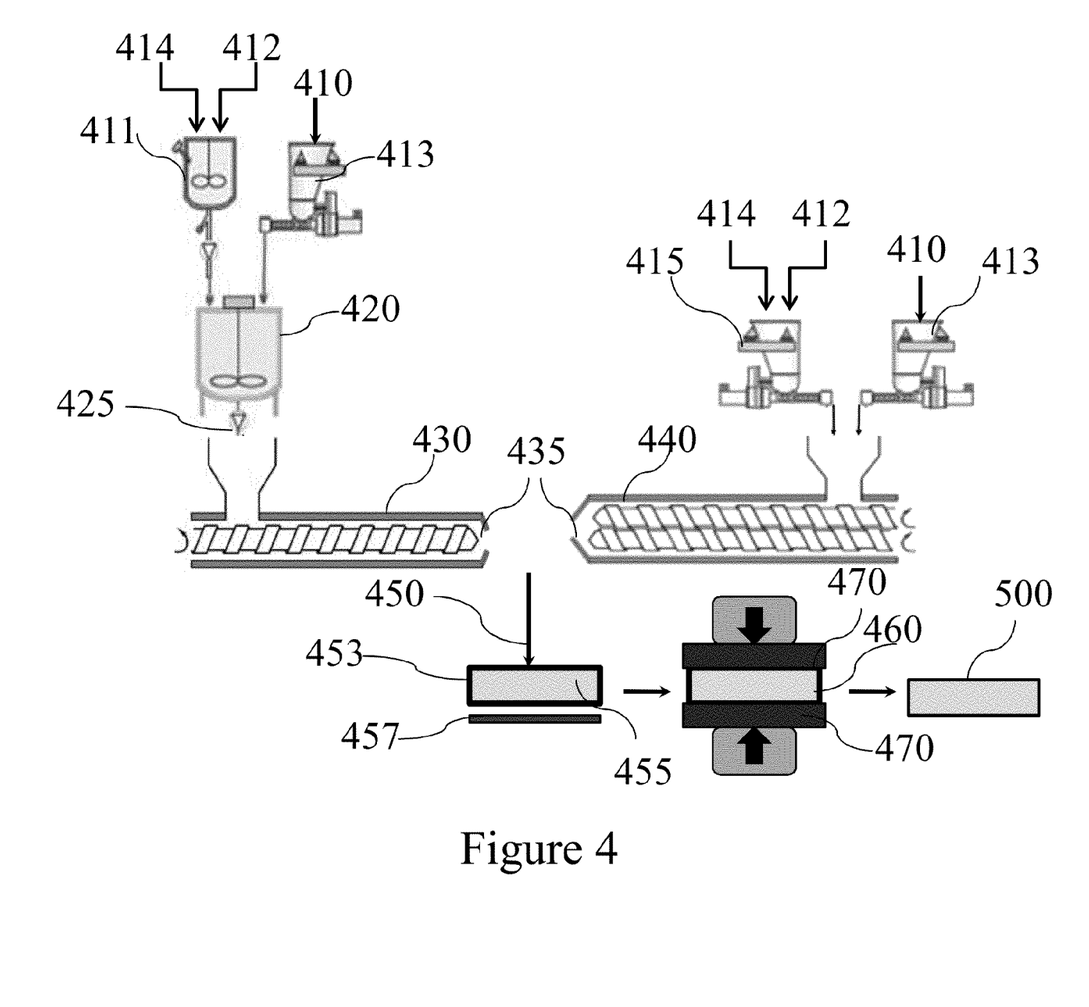
FIG. 4: A schematic diagram illustrating an exemplary method of manufacturing lightweight self-healing composites comprising region-specific microstructures that dampen ballistic energy

In one particular arrangement of this present invention, an exemplary method of making this microstructure 100 is illustrated in FIG. 4. The raw materials of the anti-ballistic composite comprise various composition ratios of thermoplastic polymers 412, nanoparticles 410, compatiblizers 414, and other additives. The compounding process of the materials can be conducted in a two step process or a single step process.

In the two step process, the nanoparticles 410, thermoplastic polymers 412 and the compatiblizers 414 can be fed into a high intensity mixer 420. The thermoplastic polymers 412 and the compatiblizers 414 can be premixed in a mixer 411 prior to feeding into the high intensity mixer 420 while the powder nanoparticles 410 can be fed into the high intensity mixer 420 through a feeder 413. Upon ensuring well-dispersion of the mixtures, the resulting mixture 425 can then be introduced into a single screw extruder 430. The extrudate of the extruder 430 can then exit through a die 435. The extrudate 450 can then be aligned and filled in a mold 453 in a crisscross pattern to form a molded preform 455 using a temperature control accessory 457. The mold 453 can then be covered and transferred into a compression molding machine 470. The covered mold 460 can then be compressed under desired levels of pressure and temperatures. The resulting molded materials 500 with a region-specific microstructure 100 can then be removed from the mold under preferred pressure conditions.

In the single step process, the nanoparticles 410, thermoplastic polymers 412 and the compatiblizers 414 can be fed through a feeder 415 and a feeder 413 individually or together into a twin screw extruder 440. The extrudate of the extruder 440 can then exit through a die 435. The extrudate 450 can then be aligned and filled in a mold 453 in a criss-cross pattern to form a molded preform 455 using a temperature control accessory 457. The mold 453 can then be covered and transferred into a compression molding machine 470. The covered mold 460 can then be compressed under desired levels of pressure and temperatures. The resulting molded materials 500 with a region-specific microstructure 100 can then be removed from the mold under preferred pressure conditions.

In another particular arrangement of this invention, the above extrudate 450 can be fed into a cooling device (such as an air-cooled or water-cooled conveyor or a water bath) and a pelletizer or a pulverizer to form compounded material in pellet form, powder form, or any other possible size-reduction forms. The resulting pellets or any other size-reduced materials can then be used in other downstream thermoforming processes such as extrusion molding, compression molding, rotational-molding, vacuum forming, or injection molding, to form the desired shaped article 500 with a region-specific microstructure 100. In addition, the resulting pellets or any other size-reduced materials can be used to produce end-user products in a monolithic form or in a laminated form with other materials. Furthermore, the resulting pellets or any other size-reduced materials can be further processed into a fine powder by any pulverizing processes.

In another particular arrangement of this present invention, the above extrudate 450 can be fed into a single screw extruding system of an injection molding machine under a proper temperature and pressure profile and injected into a mold to form the resulting shaped article 500 with a region-specific microstructure 100.

Components for Making the Region-Specific Microstructure

Energy dampening characteristics, of the lightweight thermoplastic-based self-healing composites, are strongly influenced by micro-structural variables, such as the type of additives and resins used; the way additives are arranged and the additive-matrix interface bond strength. In one embodiment of this current invention, a properly designed thermoplastic-based self-healing composite, comprising at least one semi-crystalline thermoplastic material as a matrix, at least one nucleating agent, and a compatiblizer, can dampen more energy, per unit mass, than conventional metals, i.e. anti-ballistic steel.

Polymeric Matrix

In one embodiment of this current invention, the polymer matrix material is preferred to be a semi-crystalline thermoplastic material. The semi-crystalline thermoplastic material can be flexible enough to be molded into various shapes and less expensive because it can also be sourced from the waste stream. More preferably, the thermoplastic polymer is a semi-crystalline material which have the chemical nature and surface characteristics that can withstand harsh environmental factors such as oil, acidic, basic solutions, blowing sands, dust or salt water. Ultrahigh molecular weight polyethylene (UHMWPE), a semi-crystalline polymer, is unique for its very long molecular chain structure and is widely used in both military and industrial applications for its superior wear and friction characteristics. Uses as armor are limited to cold drawn fibers, i.e. Spectra 1000®, and have a strength much higher than that of steel on a weight to unit volume basis. Unfortunately, the high levels of orientation for UHMWPE cannot be easily achieved in traditional extrusion and molding processes, due to its extremely high viscosity. As a result, non-fiber form UHMWPE is still incapable of matching strength performance values of the fiber form counterpart.

In another embodiment of this present invention, the suitable semi-crystalline polymer matrix materials capable of forming the soft regions 120 can be selected from a group of high molecular weight semi-crystalline thermoplastic polymers, including high molecular weight, high density polyethylene (HMWHDPE) homopolymer, HMWHDPE copolymer, HMWHDPE blends, HMWHDPE cross-linking precursor derivatives, and HMWHDPE reground scraps. The HMWHDPE may have similar or slightly lower molecular weight values than UHMWPE but, can be formed utilizing traditional extrusion and molding process. In one particular aspect of this invention, the HMWHDPE is defined as HDPE with molecular weight in the range of 1 to 10 million Delton. The density of the polymer is preferred to be in the range of between 0.940 $g/cm^3$ to 0.980 $g/cm^3$. The materials can be purchased from the following polyethylene manufacturers including Exxon-Mobil, BP, Formosa, and Chevron Phillips.

In another embodiment of this present invention, the suitable polymer matrix can be further modified by adding one or more of the polymers selected from the group of a lower molecular weight (less than 1 to 10 million Delton) polyethylene based copolymers including ethylene-based hexene copolymers, ethylene-based propylene copolymers, ethylene-based vinyl alcohol (EVOH) copolymers, ethylene alpha olefin copolymers, ethylene based plastomers, or ethylene based elastomers. Some of these materials can be used to fine-tune the microstructure of the soft regions 120, and thus change the overall ratios between the hard and soft regions in the region-specific microstructure 100 of this current invention. Optionally, some of these polymers can be used to bridge the gap between elastomers and plastics, with additional rubber-like properties and the processability being added into the system. Alternatively, some of the polymers can also be used to provide the air or oxygen barrier property while maintaining compatibility with the polymer matrix.

Nucleating Agents

In one embodiment of this present invention, nucleating agents can effectively enhance the crystallization mechanism to form small spherullites or lamellar structures, resulting in formation of the hard regions 110 in the region-specific microstructure 100. The suitable nucleating agents of this invention can be selected from the group including nanoparticles of metal oxides such as silicone dioxide, titanium dioxide, and tantalum pentoxide.

In one particular aspect of this invention, the above mentioned materials are preferred to be amorphous in form for its additional capability to consume energy through a possible morphological conversion. For example, an amorphous $SiO_2$, can convert to, cristobalite, a crystalline $SiO_2$, by absorbing tremendous amount of thermal energy. The temperature required for this conversion to take place is around 1400° C. under normal pressure. Other amorphous nanoparticles including titanium dioxide, $TiO_2$ and tantalum pentoxide, $Ta_2O_5$ can also be suitable nucleating agents.

In another aspect of this present invention, the nucleating agent is preferred to be able to facilitate the formation of smaller but more uniform crystallites. The smaller but uniform crystallites can help to increase the thermal stability and mechanical properties by providing appropriate link between the amorphous polymer matrix and the solid anchor site, nanoparticles. The suitable nucleating agents in this invention are preferred to have primary particle size less than about 1000 nm, more preferably less than about 500 nm, and most preferably less than about 200 nm. The suitable size of the induced microcrystalline 130 anchored on the nanoparticle nucleating agent 140 in this invention is preferred to be less than about 5000 nm, more preferably less than about 2000 nm, and most preferably less than about 1000 nm.

In one particular arrangement of the present invention, the shape of the nucleating agents is preferred to be spherical. The spherical shape can provide a large surface to volume ratio for the anchor sites and can function as a slipping agent to "slide away" the projectile or impact energy wave more efficiently than other geometries.

Compatiblizers

In one particular aspect of this present invention, it is preferred to incorporate a compatiblizer in the composition. The compatiblizer provides link and better bonding between the components with dissimilar chemical natures. In one aspect of the present invention, the polymer matrix can be hydrophobic while the nanoparticles can be hydrophilic. A suitable compatiblizer can comprise a hydrophobic backbone and a hydrophilic moiety. Alternatively, a suitable compatiblizer can comprise a portion of hydrophobic units in the backbone and a portion of hydrophilic units in the backbone. The compatiblizer helps transfer the inherent properties of nanoparticles to the surrounding plastic by improving the bonding between metal oxide molecules and hydrocarbon-based polymers. The compatiblizer also aids in dispersion of the discontinuous phase of nanoparticles into the dominant polymer matrix by increasing the heat of immersion. The compatiblizer can also reduce the interfacial tension between the non-polar polyolefin matrix and the nanoparticle, thus enhance the ability to form stronger microcrystalline domain on the nucleating agent. Alternatively, the nucleating agents can be surface-treated to impart hydrophobic characteristics. In another aspect of the present invention, the compatiblizer can function as an in-situ compatiblizer between the metal surface and the polymer matrix, further increasing the drag power as the incoming bullet metal surface encounters the material of this invention.

Suitable compatiblizer in the present invention includes but not limits to maleated polyolefins, organosilanes, organotitanates, fatty acid derivatives, long-chain chlorinated paraffins, and polyolefin copolymers with acid anhydrides incorporated into the polymer backbones (instead of grafted).

Organosilanes or organotitanates can be used to enhance compatibility of this invention in two ways. Nanoparticles can be treated directly with the silanes or titanates, thereby making them hydrophobic and thus compatible with the resin.

The silanes or titanates can also be added as coupling agents during the compounding step, improving adhesion of nanoparticles and base resins.

The suitable concentration added is generally at levels of 1% to 25% of the weight of the nucleating agents, more preferably at level of 5% to 22% of the weight of the nucleating agents, most preferably at level of 8% to 20% of the weight of the nucleating agents.

Other Additives

In another embodiment of this present invention, other additives can be included in the composition to further enhance or alter the functionality as required for final applications. Among them are lubricants, fillers, fibers, rubbers, processing aids, heat stabilizers, light stabilizers, colorants, biocides, cross-linking agents, blowing agents, and other reinforcing additives.

Region-Specific Microstructures

Morphology

Figure 5:
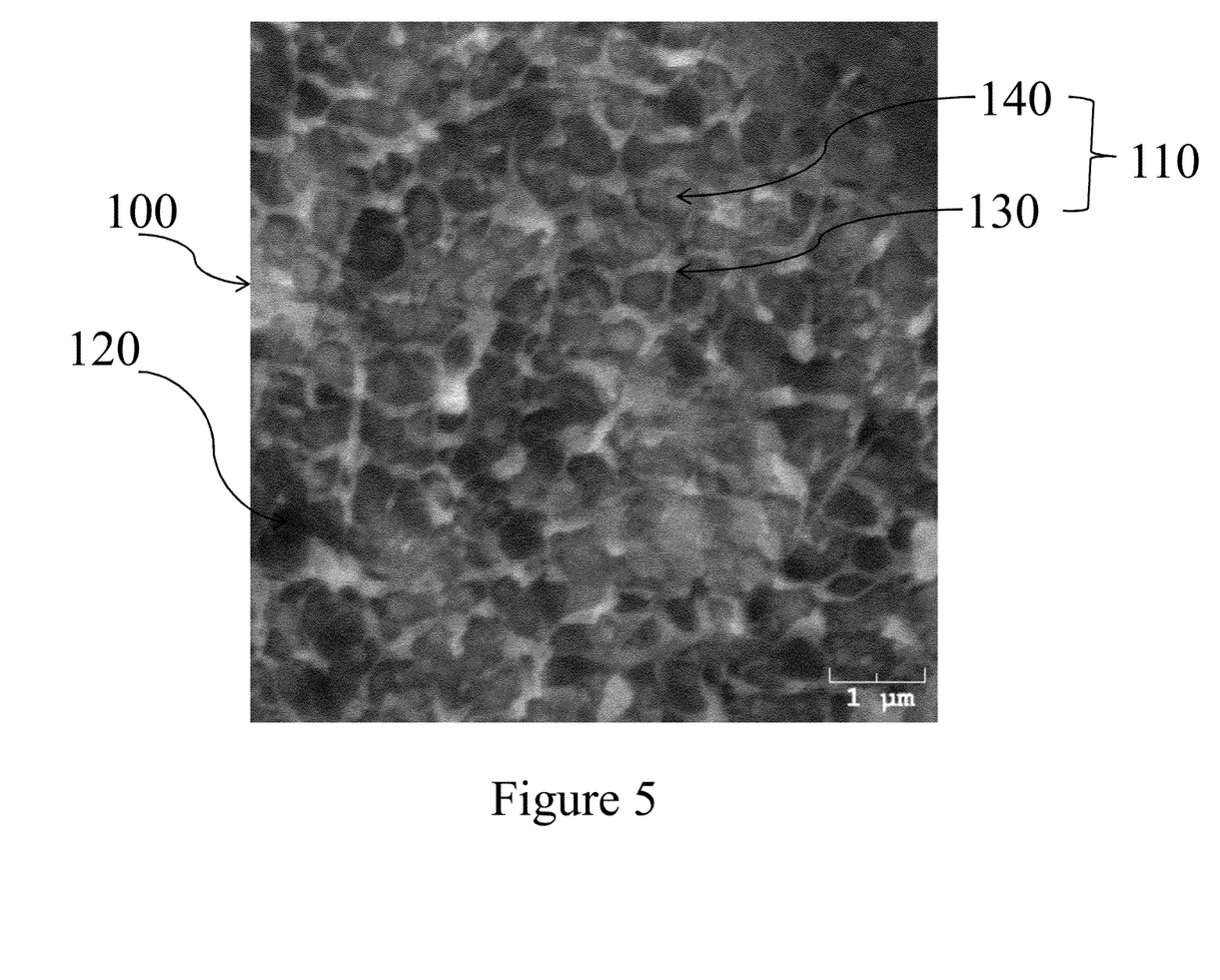
FIG. 5: A cross-sectional view of scanning electron microscopy image for the lightweight self-healing composites comprising region-specific microstructures of this invention

FIG. 5 is a cross-sectional view of a scanning electron microscope (SEM) picture of the material of this present invention. The key features about the hard regions 110 and the soft regions 120 as described in the spring-ball network structure 100 in FIG. 1 are clearly demonstrated in the SEM photo. As seen in FIG. 5, the dark areas of the picture reflect the soft regions 120 while the white honeycomb-like network structure of the picture reflects the aggregates of lamellae (or spherullites) 130 anchoring on and around nanospheres 140. The soft regions 120 can be formed by the highly entangled polymeric chains that can diminish the ballistic energy wave, while the hard regions 110 can be formed by the aggregates of lamellae (or spherullites) 130 on a nanosphere 140 to function as an anchor. The white honeycomb-like network structure provides additional stability for the region-specific microstructure upon ballistic impact.

In one particular aspect of this invention, the plurality of microcrystalline (aggregates of the spherullites or lamellae) domains 130 form a honeycomb-like porous structure by networking the surrounding microcrystalline domains. In another particular aspect of this invention, each individual honeycomb-like pore of the network structure may somehow enclose a nanoparticle nucleating agent and has an average equivalent pore size, preferably between about 100 nm to about 5 microns, more preferably between about 200 nm to about 3 microns, and most preferably between about 500 nm to about 1 micron, to reflect a proper region-specific microstructure 100. The honeycomb-like porous structure can provide further reinforcement to stabilize the region-specific microstructures 100.

Composition

The composite material with region-specific microstructure 100 is preferred to have a composition with a proper volume ratio between the soft regions 120 and the hard regions 110 for dampening different levels of impact. For a particular level of impact, if the soft region volume is too high, the composite material may not have enough anchor points for the polymer chains to re-crystallize adequately, may resulting in difficulty to restore to its original network structure in time after impact. While the hard region volume is too high, the material may not have enough entangled polymer chains to trap or slow down the ballistic piercing energy during impact. In general, a material with region-specific microstructure 100 with a higher volume ratio of the hard regions 110 is preferred for dampening higher speed projectiles, while a microstructure 100 with a higher volume ratio of the soft regions 120 is preferred for dampening lower speed projectiles or impact energy. In one arrangement of this present invention, the volume ratio between the soft regions 120 and the hard regions 110 is preferred to be about 50/50 to 95/5, more preferably, to be about 60/40 to 90/10, and most preferably to be about 70/30 to 80/20.

In another arrangement of this present invention, the semi-crystalline thermoplastic polymer 412 is preferred to be about 20% to 80% by weight in the composition of the material with region-specific microstructure 100. More preferably, to be about 30% to 70% by weight in the composition of the material with region-specific microstructure 100, and most preferably to be about 40% to 65% by weight in the composition of the material with region-specific microstructure 100.

In another arrangement of the present invention, the nanoparticle nucleating agent 410 is preferred to be about 8% to 60% by weight in the composition of the material with region-specific microstructure 100. More preferably, to be about 20% to 50% by weight in the composition of the material with region-specific microstructure 100, and most preferably to be about 25% to 45% by weight in the composition of the material with region-specific microstructure 100.

In another arrangement of the present invention, the compatiblizer 414 is preferred to be about 0% to 25% by weight in the composition of the material with region-specific microstructure 100. More preferably, to be about 2% to 20% by weight in the composition of the material with region-specific microstructure 100, and most preferably to be about 5% to 15% by weight in the composition of the material with region-specific microstructure 100.

In one embodiment of this invention, the material with region-specific microstructure is preferred to have a proper balance between stiffness and damping characteristics. As a result, the desired spring-ball structure can undergo repeated compression and decompression cycles upon encountering ballistic impacts, like a spring, through which the shock energy is dissipated. If the stiffness of the material is too high or the damping of the material is too low, the material may be too brittle and have insufficient cushion to trap the incoming ballistic energy. If the stiffness of the material is too low or the damping of the material is too high, the material may not have enough anchor sites to provide the formation of micro-crystallization around the anchor sites. Thus, it may lose its ability to form a proper spring-ball network structure or lose its ability to restore the spring-ball network structure upon ballistic impact. The balance point of the region-specific microstructure can be characterized by measuring Storage modulus, Loss modulus, and Tan delta using a dynamic mechanical analyzer.

The Storage modulus measures the contribution of the elastic component of a polymeric material, that portion of the material that will restore to its original state upon removing the stress. The Storage modulus is primarily relates to the stiffness of the materials. The Loss modulus measures the contribution of the viscous component of a polymer material, that portion of the material that will flow under conditions of stress. The Loss modulus is primarily responsible for the damping characteristic of the materials. The ratio of the Loss modulus to the Storage modulus is the Tan delta, which can be thought of as an index of viscoelasticity. A proper region-specific microstructure can enhance its ability to dampen the incoming piercing energy while retaining its proper mechanical strength for the structure to recover to its original state. In the present invention, a material with the proper region-specific microstructure is preferred to have a well-balanced combination among the three properties, Tan delta, Storage modulus, and Loss modulus.

The Storage modulus, Loss modulus, and Tan delta vary with the state of the material, its temperature, and the frequency of the applied stress. When the measured temperature rises gradually and is approaching the glass transition temperature ($T_g$) of a semi-crystalline polymer, both the Loss modulus and Tan delta rise sharply to reach their peaks as the Storage modulus goes into a decline.

When the measured temperature continues to rise way above $T_g$, the three properties all go into a decline. At this temperature range (said above $T_g$ for at least 100° C.), while molecular mobility increases, the aggregates of the microcrystalline domains and their network of the semi-crystalline polymer maintains a portion of the elasticity needed for proper structural stability. However, if the Storage modulus of the polymer declines too fast, it may not have sufficient mechanical integrity to serve beyond that temperature. In one particular arrangement of this invention, the three properties are measured at 25° C. in order to properly characterize the region-specific microstructure at the stage of this temperature range. The temperature 25° C., was chosen because it is above the $T_g$ of the HMWHDPE ($T_g$ ranges from about −135° C. to about −120° C.) for over 100° C.

In one special aspect of the present invention, the material with region-specific microstructure is preferred to have Storage modulus at 25° C. (based on ASTM D4065 measured at frequency of 1 Hertz) greater than 1,200 MPa, more preferably greater than 1,300 Megapascal (MPa), and most preferably greater than 1,500 Megapascal (MPa), in reflecting a proper arrangement between the soft regions and hard regions. If the Storage modulus is too low, the anchor sites in hard regions 110 may not have enough anchoring strength for holding the amorphous flexible chains in soft regions 120 during impact.

In another special aspect of the present invention, the material with region-specific microstructure is preferred to have Loss modulus at 25° C. (based on ASTM D4065 measured at frequency of 1 Hertz) greater than 110 Megapascal (MPa), more preferably greater than 113 Megapascal (MPa), and most preferably greater than 115 Megapascal (MPa), in reflecting a proper arrangement between the soft regions and hard regions. If the Loss modulus is too low, the amorphous flexible chains in soft regions 120 may not provide sufficient cushion to absorb the incoming piercing energy during impact.

In another special aspect of the present invention, the material with region-specific microstructure is preferred to have Tan delta at 25° C. (based on ASTM D4065 measured at frequency of 1 Hertz) between 0.03 to 0.2, more preferably between 0.07 and 0.18, most preferably between 0.10 and 0.15. If the Tan delta is too high, the viscous component contribution of the material outbalances the elastic component contribution. As a result, the crystalline anchored nanoparticles in hard regions 110 may lose its control of holding the amorphous flexible chains in soft regions 120 during impact. If the Tan delta is too low, the amorphous flexible chains in soft regions 120 may not provide sufficient cushion to absorb the incoming piercing energy during impact.

When the temperature continues to rise and is approaching about 40° C. to 50° C. bellow the melting temperature ($T_m$) of the polymer, the Tan delta rises as the Storage modulus continues to decline. If the Storage modulus declines too fast (or the Tan delta rises too fast), the crystalline portion 130 in the hard regions 110 may not have sufficient anchor strength for a proper balanced region-specific microstructure. In another particular arrangement of this invention, the three properties are measured at 90° C., which is about 50° C. below the $T_m$ of the HMWHDPE ($T_m$ ranges from about 130° C. to about 140° C.), in order to properly characterize the region-specific microstructure at the stage of this temperature range.

In one special aspect of the present invention, the material with region-specific microstructure is preferred to have storage modulus at 90° C. (based on ASTM D4065 measured at frequency of 1 Hertz) greater than 240 Megapascal (MPa), more preferably greater than 280 Megapascal (MPa), and most preferably greater than 300 Megapascal (MPa), in reflecting a proper arrangement between the soft regions and hard regions. If the Storage modulus is too low, the anchor sites in hard regions 110 may not have enough anchoring strength for holding the amorphous flexible chains in soft regions 120 during impact.

In another special aspect of the present invention, the material with region-specific microstructure is preferred to have loss modulus at 90° C. (based on ASTM D4065 measured at frequency of 1 Hertz) greater than 45 Megapascal (MPa), more preferably greater than 50 Megapascal (MPa), and most preferably greater than 55 Megapascal (MPa), in reflecting a proper arrangement between the soft regions and hard regions. If the Loss modulus is too low, the amorphous flexible chains in soft regions 120 may not provide sufficient cushion to absorb the incoming piercing energy during impact.

In another special aspect of the present invention, Tan delta measured at 90° C. (based on ASTM D4065 at frequency of 1 Hertz) for the material with region-specific microstructure is preferred to have a value less than 0.300, more preferably less than 0.280, and most preferably less than 0.250 in reflecting a proper arrangement between the soft regions and hard regions. If the Tan delta value is too high at the elevated temperature, the anchor sites in hard regions 110 can lose their anchoring strength. As a result, the microstructure loses its ability to allow the amorphous flexible chains in soft regions 120 to bounce back during impact. Therefore, the material can lose its self-generating ability to initiate the compression and decompression cycle during impacts.

In one particular aspect of this current invention, the material with region-specific microstructure is preferred to have melt viscosity in a range between 800 Pascal's to 8,000 Pascal's at a melt shear rate less than 100 $s^{-1}$ at 200° C. If the viscosity of the material is too high, the material may be too difficult to be processed and too rigid for applications requiring trapping the projectile inside the matrix. If the viscosity of the material is too low, the formation of the material may not have sufficient entanglement to provide the capability for dampening the ballistic energy.

In another special aspect of the present invention, the material with region-specific microstructure is preferred to have static IZOD notched impact resistance (based on ASTM D256) greater than 3 ft-lb/in, more preferably greater than 5 ft-lb/in, and most preferably greater than 8 ft-lb/in, in reflecting a proper arrangement between the soft and hard regions.

In another special aspect of the present invention, the material with region-specific microstructure is preferred to have Young's modulus (based on ASTM D638) greater than 450 Megapascal (MPa), more preferably greater than 455 Megapascal (MPa), and most preferably greater than 460 Megapascal (MPa) in reflecting a proper arrangement between the soft and hard regions.

In another special aspect of the present invention, the material with region-specific microstructure is preferred to have tensile strength at break (based on ASTM D638) greater than 13 Megapascal (MPa), more preferably greater than 15 Megapascal (MPa), and most preferably greater than 20 Megapascal (MPa), in reflecting a proper arrangement between the soft regions and hard regions.

Thermal-Energy Absorption

As a high energy projectile strikes a polymeric material to which its kinetic energy is transferred and partially converted into heat; the region in front of the projectile is compressed and melted. This molten polymer is then pumped past the projectile and forced into the region behind the projectile, where it cools and hardens. In one particular embodiment of this invention, the materials with region-specific microstructure 100 can take up high thermal energy converted from projectile's kinetic energy without significant degradation. When a bullet hits a target, depending on the type of fire arm and bullet, the terminal kinetic energy varies dramatically. For example, the terminal kinetic energy for a typical 0.30-06 armor piercing (AP) round at 100 yards is bit over about 2,000 foot-pounds. This kinetic energy once entering a target will partially be converted into thermal energy (or heat loss). The partial conversion of terminal kinetic energy, says only a quarter of its original kinetic energy can raise the local temperature of the system up to about 2,000° C. easily. The present invention surprisingly demonstrates the microstructure 100 can survive the extremely high temperature through the unique arrangement of the present invention.

Figure 6:
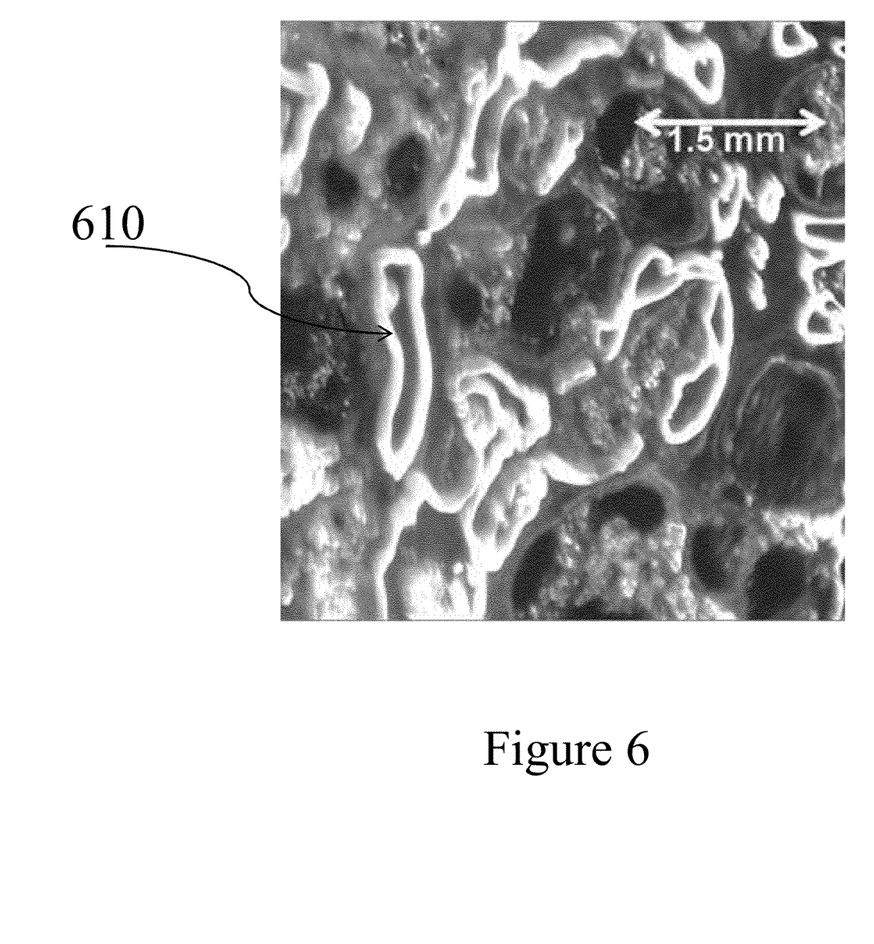
FIG. 6: A surface view of the optical microscopy image for the lightweight self-healing composites of the present invention after exposure to extremely high temperatures

In one particular aspect of this invention, the added nucleating agent material can form localized ceramic-like structures, insulating surrounding material and adding to the polymeric strength through crystallization at high temperatures. FIG. 6 is an optical micrograph of the material of this invention after being subjected to the flame of an acetylene/oxygen cutting torch for a period of 30 seconds, on full oxygen. The flame was kept in the same position, concentrating on a point 90° C. to the face of material sample. Temperatures generated by the torch with oxygen can exceed 3000° C. As heat increased amorphous silica nanospheres, a component of the formula, forms a glassy, ceramic-like network structures 610 as seen in FIG. 6. The ceramic-like network structures 610 in FIG. 6 can be a network of cristobalite, a crystalline $SiO_2$, which was converted from the amorphous $SiO_2$ by absorbing tremendous amounts of thermal energy. The temperature required for this conversion to take place can be around 1400° C. under normal pressure. In another aspect of this invention, the material with region-specific microstructure can be flame retardant for its ability to absorb and dampen the extremely high thermal energy.

Crystallinity

Semi-crystalline polymeric materials such as polyethylene can undergo crystallization. Under certain circumstances, the environmental factors, such as temperature and pressure or, the addition of nucleating agents, can facilitate the crystallization mechanism. The crystallinity can be determined by the heat of fusion using a Differential Scanning calorimeter (DSC) as compared with the heat of fusion of a theoretical value for a polymer with 100% crystallinity. Since the energy of fusion is endothermic (absorb energy from environment), the increase in heat of fusion (or crystallinity) further enhances the capacity to absorb the incoming thermal energy as compared with the unfilled counterpart.

In one particular aspect of this invention, the thermoplastic is a semi-crystalline polymer and it coexisted both in amorphous phase and crystalline phase. The overall crystallinity of the polymer matrix in the material with region-specific microstructure is preferred to be in the range of 30% to 95%, more preferably in the range of 40% to 80%, and most preferably in the range of 45% to 70%. The overall crystallinity may not need to be significantly different due to addition of the nucleating agents. However, the microcrystalline region 130 should be enforced by the addition the nucleating agents.

Applications

In one embodiment of this current invention, the thermoplastic based composites can be easily molded into any three dimensional shape and can be prepared and used in a monolithic form or in a form of lamination with other materials. The thermoplastic based composites can also be prepared into various foam structures. This can be achieved by adding additional blowing agents into the composite ingredients during a separate compounding operation. Alternatively, this can be achieved by a traditional phase inversion method. The phase inversion method utilizes the phase separation phenomenon within a polymer mixture, to develop well-defined microporous structures, as desired for its application. Specifically, phase inversion method can produce asymmetric porous structure with pores of a descending porosity gradient attached to an integrated skin.

The potential applications of this material include but not limited to (1) ballistic shields for military and law reinforcement use; (2) ballistic armor for military vehicles, particularly for protecting tracks, radiators, engines, personnel and other vulnerable areas; (3) ballistic armor components for aircraft, particularly for protecting pilot compartments, avionics packages, hydraulic systems, ejection systems, fuel systems, engine housings. etc.; (4) bullet capturing targets for sport and training—either as individual targets or complete walls: particularly suitable for tactical training targets for military and law enforcement use; (5) ballistic armor for mobile support facilities, such as mobile military command and control posts, communications installations, surgical hospitals, evacuation stations, etc.; (6) dock bumpers for trucks and large ships; (7) shock absorber in pads for building columns; (8) shields or plates forming part of tactical law enforcement or military body armor, particularly with embedded ceramic, Kevlar or nylon mailing; (9) armored doors, panels etc. for armor trucks, bank vault and other secure locations; (10) protective pads and equipments for all sports activities in foam or high density layers to make composites that have multiple laminates; (11) containment devices for bombs, unexplored ordinance, improvised explosive devices; (12) other applications where energy and impact absorption, light weight, compact size, and/or reuse are important (13) apparatus that can be used for protection of spacecraft and space personnel for flying shrapnel and solid particles; (14) emergency tornado or hurricane shelters to protect personnel from flying debris and objects; (15) applications in the large diameter pipe industry to replace and outperform concrete as the primary material; (16) applications in the oil and gas industries where facilities and infrastructures demand lightweight energy absorption materials to replace steel.

In one embodiment of this current invention, the thermoplastic based composite is a lightweight ballistic energy absorption material to replace traditional anti-ballistic materials such as steel. How lightweight of anti-ballistic material is can be characterized by the areal density, pounds per square foot (psf) against a specific high impact piercing round. The areal density (psf) is defined as the product of the density (pounds per cubic foot) of the material and its thickness (foot) required stopping the specific ballistic round. For example, for a 0.30-06 armor piecing (AP) round firing at standard steel, the areal density can typically range from 35 psf up to 60 psf. The smaller the areal density, the more lightweight of the anti-ballistic material is, and thus more weight efficient as an anti-ballistic material against a particular round.

In one particular embodiment of this current invention, for a 0.30-06 AP round, the composite material with region-specific microstructure is preferred to have an areal density not greater than 25, more preferably not greater than 20, and most preferably not greater than 15.

The invention can be further illustrated by reference to the following examples, which are not intended to be limiting of the appended claims.

Example 1

In a two-step process, component A, B, C, and/or D in total of about three pounds were first pre-blended in dry in a ratio as shown in Table 1 in a high intensity Hensehel mixer for about 40 minutes to ensure a well dispersion. The resulting mixture was then compounded using a C. W. Brabender (Model PL 2000) twin-screw extruder (counter-rotating) at a temperature profile of 200° C., 215° C., 220° C., and 220° C., to ensure even dispersion of the nanocomposite system as schematically shown in FIG. 4. The resulting extrudates exiting from a die of the extruder at temperature of 228° C. from the above two-step process were then air-cooled and pelletized into uniform pellets (3 mm in diameter and 5 mm in length) for further characterization and downstream process. All the samples exhibited good processability in formation of pellets.

Component A, the base resin is selected from one of the following HMWHDPE sources: (1) The Regrind material is taken from the waste stream, containing a small amount of EVOH (ethylene vinyl alcohol) separately listed in Component D, can be purchased from R&M Plastic; (2) Marlex™ K605 is a polyethylene homopolymer, which can be purchased from Chevron Phillips Chemical Company LP; and (3) Formolene™ HL5010 can be purchased from Formosa Plastics Corporation.

Component B, nanoparticles R320 and R300 can be purchased from Elkem.

Component C, a maleated HDPE, Amplify™ G204 can be purchased from the Dow Chemical Company.

Component D is other ethylene based resin which has a lower molecular weight than that of the corresponding base resin in the component A: (1) The EVAL™ L, an ethylene vinyl alcohol (EVOH) copolymer, which is premixed with the Regrind flake, can be obtained separately from Kuraray Co.; and (2) EXACT™ 3040, a plastomer or an ethylene based hexene copolymer, can be obtained from ExxonMobil.

TABLE 1

| Sample | A Base resin | B Nano-particle | C Compati-blizer | D Ethylene-based resin | Ratio in weight |
|---|---|---|---|---|---|
| 1 | Regrind | R320 | Amplify G204 | EVAL ™ L | 47:42:8:3 |
| 2 | Marlex ™ K605 | R320 | Amplify G204 | — | 50:42:8:0 |
| 3 | Marlex ™ K605 | R300 | Amplify G204 | Exxon 3040 | 49:35:8:8 |
| 4 | Formolene ™ HL5010 | R300 | Amplify G204 | Exxon 3040 | 49:35:8:8 |

Example 2

The resulting compounded pellets made from the example 1 were then fed and extruded through a C.W. Brabender twin-screw extruder (counter rotating) with a die opening of about ½ inch. The extrudate was then guided into a preheated mold of 6 inch by 6-inch by 3-inch in an alternating crisscross pattern in multiple layers until the mold filled up with the extrudate. The mold was then covered with a square cap and transferred to a Carver compression molding machine. The Carver compression molding machine was controlled at the temperature of 125° C., slightly below the melting of the polymer resin, for both platens. The compression molding machine was maintained at over 1,380 pounds per square inch for about 1 hour. The pressure was then gradually reduced to zero pounds per inch while the platens were gradually cooled down to room temperature. The sample panels of 6-inch by 6-inch of about 1 inch thick were then removed from the mold for testing their ballistic energy dampening properties. The panels show excellent material integrity. The resulting panels weighted at about 78 to 82 pounds per cubic foot, which is over 6 times lighter than the standard steel (490 pounds per cubic foot) and is lighter than the Kevlar fabrics (90 pounds per cubic foot).

Example 3

Static Mechanical Properties at 25° C.

The resulting compounded pellets made from example 1 and a comparative sample, Marle™ K605 HMWHDPE pellets from Chevron Phillips Chemical Company LP (as Comparative A), were then fed into an injection molding machine (Mini-Jector) at a temperature profile of 204° C., 221° C., and 221° C., respectively. The mold with captivity for tensile testing was preheated in an oven at about 150° C. The resulting samples were then tested for static mechanical properties including tensile modulus and tensile strength at break. The testing results were summarized in Table 2.

The standard method for determining tensile properties of plastics (ASTM D 638) was used to study the Young's modulus and tensile strength at break of the specimens prepared from the injection molding experiments, using a Com-Ten universal testing machine. The experiment was carried out by hanging a dog-bone shape specimen bar between two metal grips while applying a constant strain at about 0.5 inch/minute to the specimen. The testing results were then recorded and analyzed using Com-Ten C-TAP 3.1 software. Averages of 5 specimens were used for each sample in data analysis.

TABLE 2

| Sample | Young's Modulus (MPa) | Tensile Strength at break (MPa) |
|---|---|---|
| 1 | 522.29 | 31.95 |
| 2 | 559.46 | 34.64 |
| 3 | 461.22 | 25.86 |
| 4 | 553.15 | 34.27 |
| Comparative A | 455.74 | 12.92 |

Example 4

Dynamic Mechanical Properties at 25° C. and 90° C.

The resulting compounded pellets made from example 1 and a comparative sample, Marlex™ K605 HMWHDPE pellets from Chevron Phillips Chemical Company LP (as Comparative A), were then fed into an injection molding machine (Mini-Jector) at a temperature profile of 204° C., 221° C., and 221° C., respectively. The mold with captivity suitable for the ASTM D 4065 three-point bending geometry for the dynamic mechanical properties testing was preheated in an oven at about 150° C. for about 10 minutes. The resulting samples were then tested for dynamic mechanical properties including Storage modulus, Loss modulus, and Tan delta. The testing results at 25° C. were summarized in Table 3-1. The testing results at 90° C. were summarized in Table 3-2.

The standard method for determining tensile properties of plastics (ASTM D 4065) was used to study the Storage modulus, Loss modulus, and Tan delta of the specimens prepared from the injection molding experiments, using a Solids Analyzer RSA-II DMA (purchased from Rheometrics). The experiment was carried out using a three-point bending geometry. A strain of 0.02% and a frequency of 1.0 Hertz were employed for these tests. The testing results at two different temperatures, 25° C. and 90° C. were then recorded and analyzed using the TA Instrument Orchestrator v 7.2 software. Averages of 5 specimens were used for each sample in data analysis.

TABLE 3-1

(Dynamic mechanical properties at 25° C.)

| Sample | Tan Delta | Storage Modulus (MPa) | Loss Modulus (MPa) |
|---|---|---|---|
| 1 | 0.144 | 1,562 | 225.2 |
| 2 | 0.111 | 1,683 | 185.9 |
| 3 | 0.084 | 1,356 | 114.0 |
| 4 | 0.106 | 1,626 | 172.7 |
| Comparative A | 0.091 | 1,164 | 106.3 |

TABLE 3-2

(Dynamic mechanical properties at 90° C.)

| Sample | Tan Delta | Storage Modulus (MPa) | Loss Modulus (MPa) |
|---|---|---|---|
| 1 | 0.231 | 243 | 56.3 |
| 2 | 0.214 | 428 | 91.4 |
| 3 | 0.242 | 309 | 74.9 |
| 4 | 0.217 | 350 | 75.9 |
| Comparative A | 0.263 | 254 | 67.0 |

Example 5

Resistance to Thermal Energy and Flame

This experiment was carried out by burning specimens of interest to simulate the extremely high thermal energy, using an acetylene/oxygen cutting torch for a period of 30 seconds, on full oxygen. The specimens (dog-bone shape about 5 inch long by 0.5 inch wide by 0.125 inch thick) obtained from the injection molding process as described in example 3 were placed on top of a tile. The flame was kept in the same position, concentrating on a point 90° C. to the material sample. Temperatures generated by the torch with oxygen can exceed 3,000° C. All the specimens made of the present invention maintain their integrity while the control Comparative A specimen (made of pure HMWHDPE) melted completely, left behind only ashes on the ceramic tile, under identical experimental conditions.

Example 6

Ballistic Testing

The resulting panels of 6-inch by 6-inch in various thicknesses from the example 2 were then used as firing targets for a ballistic testing with a firing weapon of 0.30-06 rifle and animation of 0.30-06 armor piercing (AP) rounds. The control target (Comparative B:) is 6-inch by 6-inch steel plates (of a density of 490 lbs/ft$^3$) of various thicknesses. The rifle is positioned about 20 feet away from the target. When fired, rounds hit the target were kept to as close to 90 degrees as possible. Target panels were confined inside a specially made steel box which can accommodate multiple 6-inch by 6-inch panels with a total stacking thickness up to 2 feet.

Table 4 summarizes the ballistic testing results in terms of its ability to stop the AP rounds, its areal density at the thickness that can stop the AP rounds, description of the bullet head after impact, and the average penetration depth of the AP round. The areal density in pounds per square foot (lbs/ft$^2$) is a measure of how light the material can be at the thickness that can stop the projectile (0.30-06 AP round). As a result, the panels of this invention can stop the armor piercing round at a much lighter weight (as evidenced by the lower areal density) than the panels of the control Comparative B. Furthermore, the panels of this invention significantly distored the bullet head trapped in the samples while the steel plates allow the bullet head to remain intact. In addition, the panels of this invention significantly deflected the bullet travel path while the steel plates allow the path of the round to remain straight.

TABLE 4

| Sample | Ability to stop AP round | Areal density (lbs/ft$^2$) | AP bullet head distorted | Penetration depth (inch) |
|---|---|---|---|---|
| 3 | Yes | 17.8 | Yes | 2.75 |
| 4 | Yes | 14.6 | Yes | 2.25 |
| Comparative B | Yes | 40.8 | No | 1.0 |

Example 6

Ballistic Testing

A larger target was manufactured from the pellets developed in example 1 into a 2-foot by 2-foot by 1-foot panel. The material was subjected to intense firing >2,500 rounds from AK-47, M-16AP, M-240MG, 12-gauge shot-gun, firing slugs, and a Golf 30 caliber machine gun. Results indicated no penetration of the material, no spall, and all rounds captured. The target maintained integrity without degradation and exhibited self-healing behavior. Upon further study, the target material was cross-sectioned and condition of both the composite material and projectiles showed "back-stacking" of the projectiles, bullet on bullet, encased in the composite, which had melted into the projectiles. The projectiles were in various conditions, some were ripped apart; some turned 90° on themselves. The bullet path was disrupted as it gave up energy.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:
1. A lightweight self-healing composite comprises a region-specific microstructure in a monolithic form that dampens ballistic energy wherein the region-specific microstructure includes at least one semi-crystalline thermoplastic, at least one nanoparticle nucleating agent, and at least one compatiblizer selected from the group consisting of grafted maleated polyolefins, organosilanes, fatty acid derivatives, long-chain chlorinated paraffins, and polyolefin copolymers with acid anhydrides incorporated into the polymer backbones,     wherein the at least one nanoparticle nucleating agent is selected from the group consisting of silicone dioxide, titanium dioxide, tantalum pentodixe and a combination thereof, and wherein the at least one nanoparticle nucleating agent has a particle size less than 200 nm and is about 20% to 50% by weight of the said self-healing composite,     wherein the region-specific microstructure comprises (i) hard regions comprised of thermoplastic microcrystallines developed from the at least one semi-crystalline thermoplastic, anchored on nanoparticle nucleating agents and (ii) soft regions comprised of thermoplastic amorphous chains developed from the at least one semi-crystalline thermoplastic,     wherein the hard regions are substantially surrounded by the soft regions, wherein the volume ratio of the soft regions to the hard regions is from about 50/50 to about 95/5,     wherein the thermoplastic microcrystallines in the hard regions further form a honeycomb-like porous network structure comprising pores with an average pore size ranging from about 100 nm to about 5 microns,     wherein the self-healing composite has anti-ballistic capability to stop a 0.30-06 armor piercing round with an areal density not greater than 25 pounds per square foot.

2. The lightweight self-healing composite of claim 1 wherein the soft regions are connected each other by at least one semi-crystalline polymer coexisting with one end in the soft regions and with the other end anchored in the hard regions.

3. The lightweight self-healing composite of claim 1 wherein the region-specific microstructure that dampens ballistic energy undergoes compression and decompression upon encountering ballistic impacts, like a spring, through which the shock energy is dissipated.

4. The lightweight self-healing composite of claim 1 wherein the semi-crystalline thermoplastic is selected from the group consisting of high molecular weight high density polyethylene homopolymer, high molecular weight high density polyethylene copolymer, high molecular weight high density polyethylene blends, high molecular weight high density polyethylene cross-linking precursor derivatives, and high molecular weight high density polyethylene reground scraps.

5. The lightweight self-healing composite of claim 1 wherein the nanoparticle nucleating agents can undergo a morphological change at elevated temperature from an amorphous phase to a crystalline phase by absorbing heat.

6. The lightweight self-healing composite of claim 1 wherein the self-healing composite has a Storage modulus at 25° C. of not less than 1,300 MPa.

7. The lightweight self-healing composite of claim 1 wherein the self-healing composite has Tan delta at 25° C. ranging from 0.09 and 0.15.

8. The lightweight self-healing composite of claim 1 wherein the self-healing composite has Tan delta at 90° C. of less than 0.250.

9. The lightweight self-healing composite of claim 1 wherein the self-healing composite has a Young's modulus of not less than 460 MPa.

10. The lightweight self-healing composite of claim 1 wherein the self-healing composite can trap multiple incoming projectiles inside the region-specific microstructure without significant degradation and the trapped projectile heads are significantly distorted.

\* \* \* \* \*